United States Patent [19]

Dearman

[11] 4,440,383

[45] Apr. 3, 1984

[54] PIPE CUTTING APPARATUS

[76] Inventor: Timothy C. Dearman, Pearland, Tex.

[21] Appl. No.: 489,559

[22] Filed: Apr. 28, 1983

[51] Int. Cl.³ .............................................. B23K 7/04
[52] U.S. Cl. ......................................... 266/54; 266/56
[58] Field of Search ................................... 266/54, 56

[56] References Cited

U.S. PATENT DOCUMENTS

| 1,505,106 | 8/1924 | Schröder | 266/54 |
| 2,442,505 | 6/1948 | Millett | 266/56 |
| 2,843,373 | 7/1958 | Livers | 266/56 |
| 3,265,379 | 8/1966 | Mighton | 266/56 |

Primary Examiner—W. Stallard
Attorney, Agent, or Firm—Learman & McCulloch

[57] ABSTRACT

Apparatus for cutting a pipe tube turn has a frame that may be fixed on the pipe and mounts a cutting torch for movement orbitally of the tube turn's longitudinal axis and in a plane that is at right angles to such axis. The cutting torch is stabilized and guided during its movements by two sets of followers which straddle the torch and engage the tube turn's surface. Each set of followers has a pair of rollers journaled in a common axis and straddling the cut made by the torch.

18 Claims, 9 Drawing Figures

PIPE CUTTING APPARATUS

BACKGROUND OF THE INVENTION

In the cutting of pipes it is conventional to mount a cutting torch on the pipe from which a length is to be cut and rotate the torch about the longitudinal axis of the pipe to cut the latter. The pipe may be cut along a plane which is perpendicular to the axis of the pipe, or along a plane which is inclined to the pipe's axis, or along a curvilinear line. Further, the cut edge of the pipe may be either perpendicular to the axis of the pipe or beveled. Typical of apparatus used heretofore in the cutting of pipes are the mechanisms illustrated in Brown U.S. Pat. No. 1,860,653; Brown U.S. Pat. No. 1,885,107; Wheeler U.S. Pat. No. 2,990,169; and Livers U.S. Pat. No. 3,409,282.

When the pipe from which a section is to be cut is out-of round, rather than truly cylindrical, complications are introduced. One of the most common problems encountered when cutting an out-of round pipe is that of maintaining the cutting torch at a uniform distance from the pipe's surface about the entire circumference of the pipe, and particularly if the cut edge of the pipe is being beveled. If the distance from the torch to the pipe surface varies, the resulting line of cut also will vary, thereby precluding the formation of an end surface having the desired configuration.

The difficulties encountered when cutting out-of-round pipes have been recognized heretofore. See, for example, Mighton U.S. Pat. No. 3,265,379 which discloses an attachment for pipe cutting mechanisms of the kind disclosed in the other patents referred to above and which is intended to compensate for out-of-roundness of a straight length of pipe when the latter is being cut at right angles to its longitudinal axis.

In the construction of pipelines it often is necessary to connect a pair of adjacent straight pipe sections by means of a curved tube turn or elbow section. Each end of the tube turn must match the confronting end of the straight section exactly so as to enable a proper weld to be made. Normally, the end of the straight section lies in a plane which is normal to the longitudinal axis of the straight section and, as a consequence, the adjacent end of the confronting tube turn also should lie in the same plane. In the cutting of such tube turn, however, it heretofore has been difficult to form a cut end which is truly normal to the longitudinal axis of the tube turn at the plane of the cut. Unless the plane of the cut end of the tube turn is truly normal to the longitudinal axis of the tube turn at the plane of the cut, however, the resulting configuration of the cut end will be elliptical or some other configuration, rather than cylindrical.

Greene U.S. Pat. No. 3,417,980 discloses apparatus which may facilitate the cutting of tube turns to avoid elliptical ends, provided the tube turn itself is not out-of-round. Unfortunately, however, out-of-round tube turns are commonly encountered. The cutting of an out-of-round tube turn without compensating for the out-of-roundness thus cannot result in a cut end that is truly cylindrical. Heretofore, however, there does not appear to be any provision made for compensating for out-of-roundness of tube turns.

SUMMARY OF THE INVENTION

A principal objective of the present invention is to provide pipe cutting apparatus which is equally capable of compensating for out-of-roundness of straight pipe sections and tube turn sections so as to enable the cut end of either such section to conform to a predetermined configuration. This objective is achieved according to the invention by the provision of a frame that may be mounted on a pipe section and which supports a cutting torch for rotation through a complete circle while maintaining the distance between the torch and the pipe's surface virtually uniform. The frame may be mounted on a straight length of pipe, and it also may be mounted on a tube turn. In either case the torch holder is carried by the frame for movement in an orbital path about the axis of the pipe and in a plane that has a predetermined relationship to the longitudinal axis of the pipe section at such plane.

The torch is yieldably biased toward the longitudinal axis of the pipe section and is provided with a stablizer having pipe-engageable followers which bear against the surface of the pipe and are movable toward and away from such axis in accordance with variations in the radius of such pipe. The followers comprise two pairs of rollers that are spaced apart in a direction circumferentially of the pipe a distance sufficient to accommodate the cutting torch therebetween and the rollers of each pair are journaled on a common axis and spaced apart a distance to straddle the plane of the cut made by the torch. Each pair of rollers also is capable of tilting or rocking movement relative to the stabilizer to enable the rollers on opposite sides of the plane of the cut to adapt to changes in curvature of a tube turn section. The torch stablizer is pivoted for rocking movement about an axis midway between the pairs of followers so as to enable the torch stabilizer to adjust automatically and compensate for variations in the surface contour of a tube turn as the torch orbits the latter.

The torch support enables the torch to be adjusted between positioned in which it may cut a pipe section in such manner as to produce a cut end which is perpendicular to the pipe's longitudinal axis, or beveled in either of two directions.

DESCRIPTION OF THE DRAWINGS

The construction and operation of the invention are explained in the following description and illustrated in the accompanying drawings wherein.

THE PREFERRED EMBODIMENT

Figure 1:
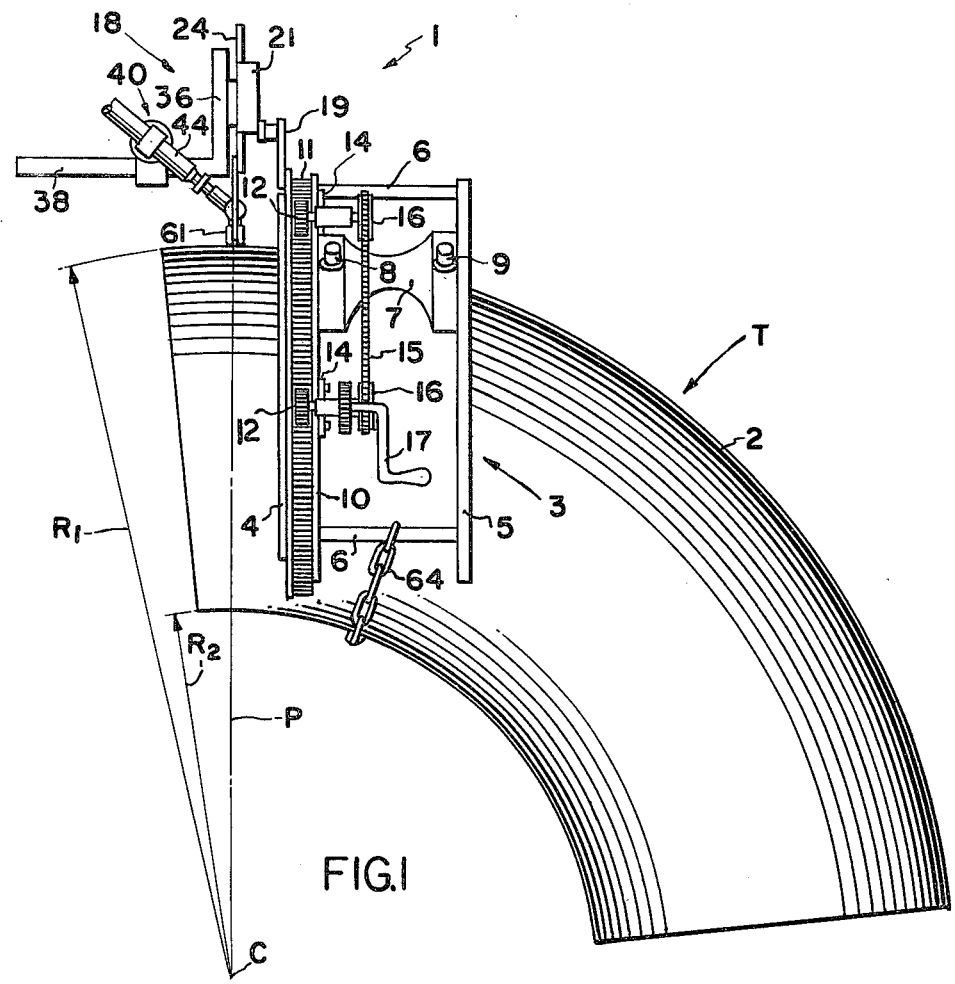
FIG. 1 is a side elevational view of the pipe cutting apparatus installed on a tube turn.
Figure 2:
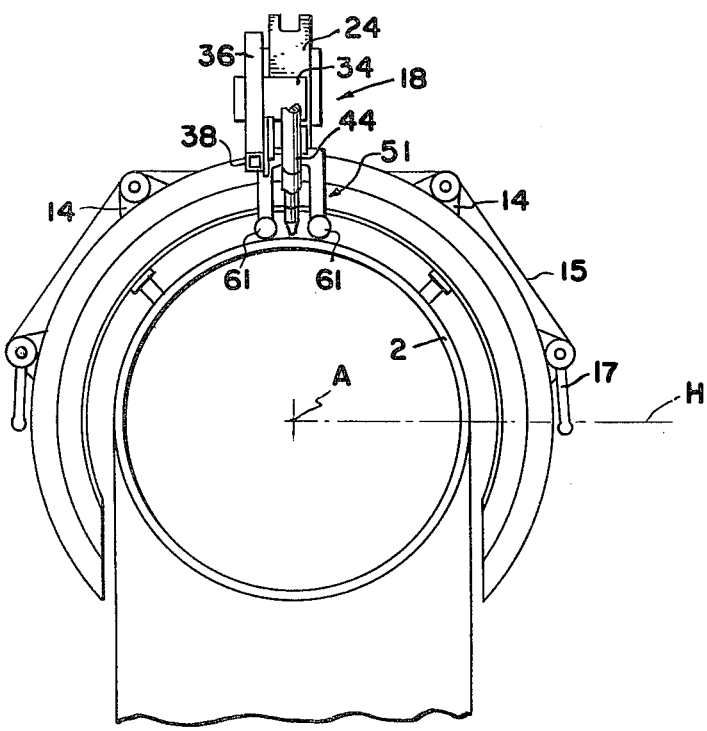
FIG. 2 is an end elevational view of the apparatus shown in FIG. 1.

Apparatus constructed in accordance with a presently preferred embodiment of the invention is designated generally by the reference character 1 and is illustrated in FIGS. 1 and 2 as being applied to right angular elbow or tube turn pipe section T having a wall 2. It should be borne in mind, however, that the apparatus 1 is equally adapted for use in conjunction with straight pipe sections and, therefore, has utility in circumstances other than that of cutting tube turns.

The apparatus 1 comprises a generally U-shaped frame 3 having spaced frame bars 4 and 5 joined by connecting rods 6. Also spanning the frame bars 4 and 5 is a saddle 7 having a pair of front supports 8 and a pair of similar, rear supports 9 which preferably are adjustable axially toward and away from the pipe section for a purpose presently to be explained. The frame bar 4 supports an arcuate ring gear segment 10 having teeth 11 in mesh with pinion gears 12 mounted on supports 14 and coupled to one another by a sprocket chain 15 trained around sprocket wheels 16. One or more of the pinions 12 is provided with a handle 17 to effect rotation of all pinions simultaneously and corresponding rotation of the ring gear segment 10 relative to the frame members 4 and 5.

A cutting torch support 18 is secured to the ring gear segment 10 for movement with the latter and comprises a frame member 19 fixed to the segment 10 for rotation therewith. The member 19 carries a bracket 20 to which a housing 21 is secured by means of a flange 22 and bolts 23.

The housing 21 is similar to the corresponding unit disclosed in Mighton U.S. Pat. No. 3,265,379 and has a vertical slideway at its forward end in which is accommodated a vertically reciprocable slide 24 having a toothed rack 25 on its rear surface. In mesh with the rack 25 is a pinion (not shown) fixed to one end of a shaft 26 that is journaled in the housing 21 and has a driving wheel 27 secured to its other end. The slide 24 thus may be reciprocated by rotation of the wheel 27.

Figure 3:
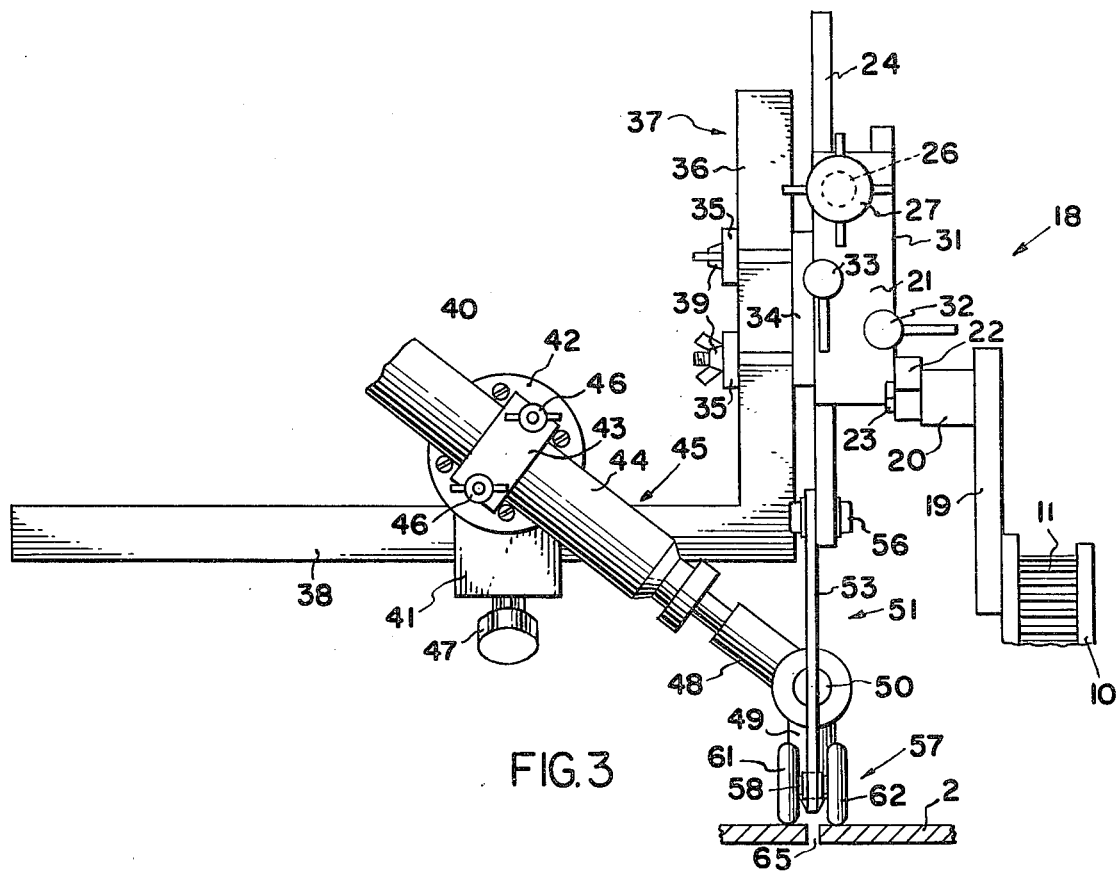
FIG. 3 is a fragmentary view partly in section and partly in side elevation of a portion of the apparatus shown in FIGS. 1 and 2, but on a greatly enlarged scale.
Figure 4:
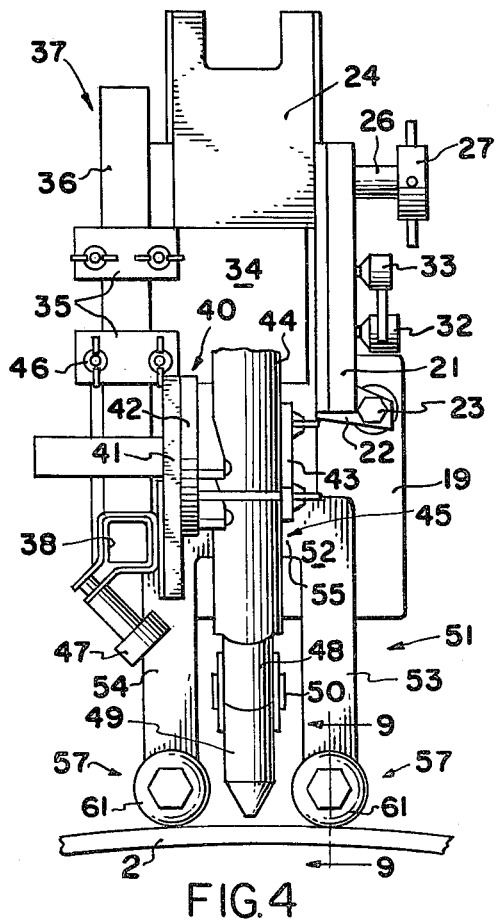
FIG. 4 is a front elevational view of the apparatus shown in FIG. 3.
Figure 5:
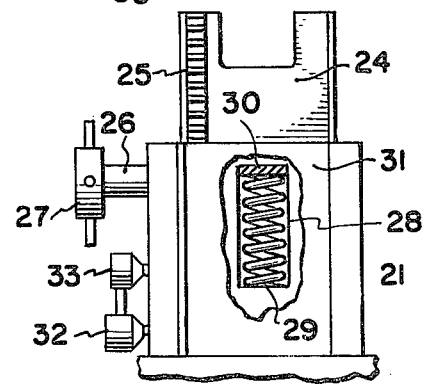
FIG. 5 is a fragmentary, rear elevational view of a portion of the apparatus as shown in FIG. 3.

The slide 24 has a recess 28 (FIG. 5) therein and within which is accommodated a compression spring 29. One end of the spring seats on the base of the recess 28 and the other end seats on a tongue 30 that is fixed to and projects forwardly into the recess from a vertically slideable plate 31 forming the rear wall of the housing 21. The arrangement is such that the spring 29 constantly biases the slide 24 downwardly, as viewed in FIGS. 3 and 5. A lock screw 32 is operable to lock the rear plate 31 in any selected position relative to the housing 21 and a similar lock screw 33 is operable to lock the slide 24 in any selected position of adjustment relative to the housing 21.

The apparatus thus far described forms no part of the invention aside from the manner in which it cooperates and reacts with the structure described hereinafter.

Fixed to the forward side of the reciprocable slide 24 for movement therewith is a mounting plate 34 on which is secured a pair of clamp bars 35 that bear against a vertical leg 36 of an L-shaped support bracket 37 having a horizontal second leg 38 which projects forwardly of the slide 24. Wing nut and bolt assemblies 39 clamp the leg 36 in any selected position of vertical adjustment relative to the slide 24. Slideably mounted on the bracket arm 38 is a clamp 40 on which is fixed a base 41 provided with a rotary bracket 42 equipped with a clamp bar 43 for clamping the barrel 44 of a conventional acetylene or other cutting torch 45. The barrel 44 may be fixed in any selected longitudinal position of adjustment by wing nut assemblies 46, and the clamp 40 may be fixed in any selected position longitudinally of the bracket leg 38 by a lock screw 47.

Figure 7:
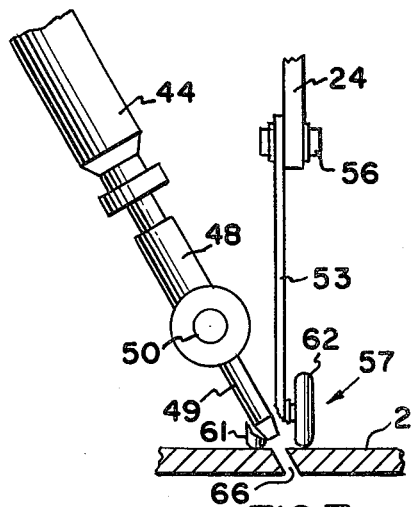
Figure 8:
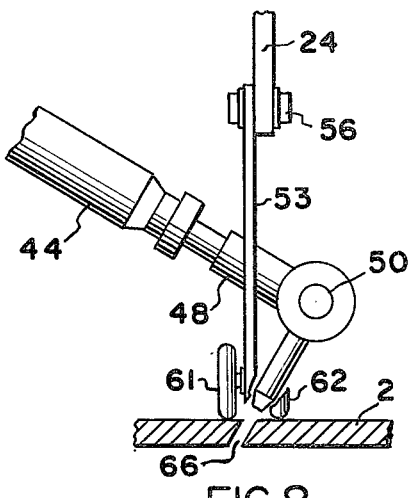

As is best shown in FIGS. 7 and 8 the barrel 44 of the cutting torch 45 has an extension 48 to which a tip 49 is rockably connected by a pivot joint 50 of conventional construction. The tip 49, therefore, may be rotated through more than 180° to any selected angular position relative to the longitudinal axis of the barrel 44.

Figure 9:
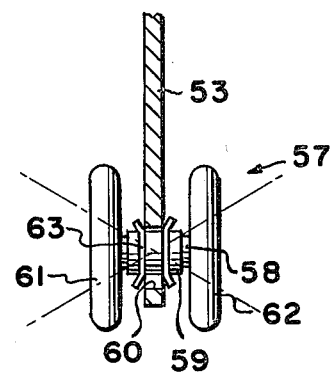
FIG. 9 is an enlarged, sectional view taken on the line 9—9 of FIG. 4.

Torch stabilizing means is designated generally by the reference character 51 and comprises a U-shaped body 52 having a pair of spaced apart, parallel legs 53 and 54 joined at corresponding ends by a cross-bar 55 that is pivoted to the slide 24 midway between the legs 53 and 54 by a pivot pin assembly 56. At the free end of each leg 53 and 54 is a guide follower assembly 57 comprising a shaft 58 journaled in a bushing 59 that extends through an opening 60 in the associated leg. At opposite ends of the shaft 58 are rollers 61 and 62 which straddle the leg 53. Each follower assembly is maintained in axially fixed relation with its associated leg by any suitable means, such as dished flanges 63 threaded onto or otherwise suitably fixed to the bushing 59. The opening 60 in each leg 53 and 54 is vertically elongated so as to have a height greater than the diameter of the bushing 59. This enables the longitudinal axis of the shaft 58 to tilt or rock in a vertical plane, as is indicated by the chain lines in FIG. 9.

When it is desired to use the apparatus 1 to cut the wall 2 of the tube turn T, the frame 3 is placed on the tube turn with the adjusting screws 8 and 9 in engagement with the upper surface of the wall 2. The screws 8 and 9 are manipulated so that the plane of the forward face of the ring gear segment 10 exactly parallels a plane P that corresponds to the line on which the tube turn is to be cut. The plane P passes through the center C of the arc on which the tube turn T is formed. The frame 3 then is clamped in place on the tube turn by a chain clamp 64 or the like.

Following proper positioning and clamping of the frame 3 on the tube turn T, the slide 24 is adjusted so that the two sets of followers 57 engage the surface of the wall 2. When properly positioned, the two rollers of each follower assembly straddle the plane P.

Once the torch support 51 has been adjusted so that the rollers engage the wall 2 of the tube turn, the housing rear plate 31 and the slide 24 are manipulated so that the spring 29 constantly, but yieldably, biases the slide 24 and the torch supporting bracket 37 toward the longitudinal axis A of the tube turn. The stabilizer 51, however, limits movement of the torch support toward the axis of the tube turn.

Figure 6:
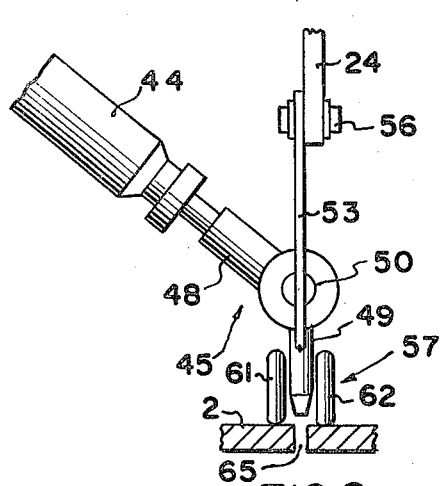
FIGS. 6, 7, and 8 are fragmentary, partly elevational and partly sectional views similar to FIG. 3, but illustrating a cutting torch in various positions of adjustment.

Once the follower assemblies 57 are properly adjusted, the bracket 37 may be adjusted vertically of the slide 24 and the torch 45 adjusted longitudinally of the bracket arm 38 so as to position the tip 49 between the legs 53 and 54 of the stabilizer 51 and with the longitudinal axis of the tip 49 in a desired position. For example, in FIGS. 1–4 and 6 the tip 49 is vertical and perpendicular to the surface of the wall 2, whereas in FIGS. 7 and 8 the longitudinal axis of the tip 49 is inclined to the horizontal. When the torch tip 49 is oriented as shown in FIG. 6, the torch will burn through the wall 2 to make a cut 65 having right angular edges, whereas orienting the tip 49 as shown in FIGS. 7 and 8 results in making a cut 66 having beveled edges.

As is apparent from FIG. 1, the radius $R_1$ of the outer surface of the tube turn T is greater than the radius $R_2$ of the inner surface of the inner surface tube turn. As also is apparent from FIG. 1, the curvilinear lengths of the outer and inner surfaces of the tube turn from the free end of the latter to the plane P are different because of the difference in radii. The differences in curvilinear lengths are significant to the construction of the apparatus, as will be pointed out.

It is not possible for either of the rollers 61 and 62 of either pair of followers to lie in the plane P of the cut that is to be made to the tube turn wall 2. This is because a roller occupying the plane P would lie in the cut and perform no supporting function. Thus, the rollers 61 and 62 must be axially spaced apart a distance sufficient to straddle the plane P. The axial spacing of the rollers 61 and 62, coupled with the differences in curvilinear lengths of the inner and outer surfaces of the tube turn, subjects the followers to forces which, if not compensated for, would result in small differences in the spacing between the cutter tip 49 and the wall 2 as the torch orbits the tube turn. The ability of the roller journal shaft 58 of each set of followers to rock about an axis tranverse to the axis A of the tube turn enables the necessary compensation to be achieved.

The difference in curvilinear lengths of the outer and inner surfaces of the tube turn are not present at those points of the wall 2 that are tangent to a horizontal plane H passing through the longitudinal axis A of the tube turn. This is because, at these points, there is no longitudinal curvature of the tube turn. The ability of the journal shafts 58 to rock, as described, enables the rollers to accommodate and compensate for the changes in the pipe's surface as the rollers orbit the pipe.

Since the two sets of followers are spaced apart from one another circumferentially of the tube turn, movement of the torch circumferentially of the tube turn causes one set of follower rollers to lead the other as it traverses the wall surface 2. Thus, the rollers of the leading set will engage irregularities in the pipe's outer surface which may cause the leading rollers to move toward or away from the axis A. The ability of the stabilizer 51 to rock about the axis of the pivot pin 56, however, enables the followers to compensate for such variations. Since each set of rollers is rockable independently of the other and since the torch stabilizer 51 is rockable about the pivot 56 midway between the two sets of followers, it is possible for both sets of follower rollers to maintain engagement with the surface 2 of the tube turn throughout the oribtal movement of the torch.

If the tube turn is not truly cylindrical, but is out-of-round, as most often is the case, the ability of each set of follower rollers to rock about one axis transverse to the longitudinal axis A of the tube turn and about a second axis parallel to the longitudinal axis A of the tube turn enables both sets of followers to remain in engagement with the surface of the wall 2 regardless of whether the tube turn is perfectly cylindrical or out-of-round. Consequently, the distance between the tip 49 of the torch and the surface of the wall 2 remains virtually constant throughout the orbital movement of the torch, thereby making possible cutting of the tube turn along a plane P that is truly perpendicular to the longitudinal axis A at its intersection with plane P.

This disclosure is representative of a presently preferred form of the invention, but is intended to be illustrative rather than definitive thereof. The invention is defined in the claims.

I claim:

1. A stabilizer for a pipe cutter movable orbitally about an axis, said stabilizer comprising a body having a pair of parallel, spaced apart legs extending from a cross-bar; a pair of pipe engageable followers; means mounting said followers on each of the legs of said body and remote from said cross-bar so that said followers may engage a pipe; and means carried by said cross-bar substantially midway between said legs for mounting said body for rocking movements about an axis substantially parallel to the first mentioned axis.

2. A stabilizer according to claim 1 wherein each of said followers comprises a roller.

3. A stabilizer according to claim 1 wherein each of said followers comprises a pair of rollers journaled on a common axis.

4. A stabilizer according to claim 3 wherein said common axis is tiltable.

5. A stabilizer according to claim 3 wherein the rollers of each pair are positioned on opposite sides of the associated leg of said body.

6. A stabilizer according to claim 1 wherein the spacing between said legs is sufficient to enable a pipe cutter to be accommodated therebetween.

7. A stabilizer according to claim 1 wherein the spacing between said legs and the associated follower is sufficient to enable a pipe cutter to be accommodated between the followers of said pair.

8. A stabilizer according to claim 1 wherein the mounting means for each of said followers comprises a shaft extending through an opening in the associated leg of said body.

9. A stabilizer according to claim 8 wherein the size of said opening is larger than that of said shaft.

10. Apparatus according to claim 9 wherein each of said followers comprises a pair of rollers at opposite ends of said shaft and on opposite sides of said leg.

11. In pipe cutting apparatus having a cutter support movable orbitally about an axis to enable a cutter carried by said support to cut a pipe along a plane transverse to said axis, means for biasing said support toward said axis, and stabilizing means coupled to said support for limiting movement of the latter toward said axis, the improvement comprising a pair of follower means carried by said stabilizing means for engagement with the surface of such pipe, the follower means of said pair being spaced from one another circumferentially of said pipe a distance to accommodate a pipe cutter therebetween.

12. Apparatus according to claim 11 wherein said stabilizing means is coupled to said support for movement about a second axis substantially parallel to the axis of said pipe.

13. Apparatus according to claim 12 wherein said second axis is substantially midway between said pair of follower means.

14. Apparatus according to claim 11 wherein each of said follower means includes a roller engageable with the surface of said pipe adjacent said plane.

15. Apparatus according to claim 11 wherein each of said follower means includes a pair of rollers engageable with the surface of said pipe, the rollers of each pair being spaced apart a distance sufficient to straddle said plane.

16. Apparatus according to claim 15 wherein the rollers of each pair are journalled on a common axis.

17. Apparatus according to claim 15 wherein the rollers of each pair are movable relatively to said stabilizing means toward and away from said axis.

18. Apparatus according to claim 15 wherein the rollers of each pair are journalled on a common shaft and wherein each of said shafts is rockable about a second axis transverse to the axis of said pipe.

* * * * *